Dec. 3, 1957          J. BLAND          2,815,436

WELDING ALUMINUM CLAD STEEL

Filed June 21, 1955

Julius Bland
INVENTOR.

BY Byron A. Vance

ATTORNEY

United States Patent Office 2,815,436
Patented Dec. 3, 1957

2,815,436

WELDING ALUMINUM CLAD STEEL

Julius Bland, Munster, Ind., assignor to Standard Oil Company, Chicago, Ill., a corporation of Indiana Application June 21, 1955, Serial No. 516,955

12 Claims. (Cl. 219—74)

This invention relates to a method of welding aluminum clad steel members and more particularly it pertains to a method of welding aluminum clad steel members from the steel side of such members.

The use of steel members with a corrosion resistant liner bonded thereto in the petroleum and chemical industry has been practiced extensively. Numerous methods of welding such composite members have been proposed. For instance, U. S. Patent 1,934,065 issued to Sune Hermanson teaches a method of making lined nozzles which includes the steps of forming a welding groove between two edges of such lined members, making a first electric weld joining the corrosion resistant liner, and making a second electric weld joining the relatively thicker base metal plate.

With the advent of aluminum clad steel members, however, the use of such welding methods have not proven feasible. Welding of clad members as taught by the prior art has been directed to composite members having a relatively thicker base of steel and a thinner cladding of a corrosion resistant material such as nickel or nickel alloys, chromium alloys and various other alloys generally referred to as stainless steel. These corrosion resistant materials are characterized by being somewhat similar to carbon steel in many of their physical properties. For instance, they may be melted with steel generally thereby forming an alloy having properties such as strength and hardness somewhat comparable, if not better, than before alloying. Thus, welding of such corrosion resistant liners to steel does not present a serious problem inasmuch as the two materials tend to alloy where joined and form a strong bond. Such alloying does not occur between steel and aluminum. When steel and aluminum are melted together, such as in welding aluminum cladding to a steel base plate using the techniques taught by the prior art for welding other corrosion resistant liner materials to steel, an "alloy" is formed which is very brittle and weak. It is an object of this invention to provide a method of welding aluminum clad steel whereby a minimum amount of alloying is produced at the interface of the two materials and a strong bond is produced therebetween. It is a further object of this invention to provide a method of welding aluminum clad steel members whereby a continuous, protective, mechanically strong aluminum clad side is provided.

Another problem encountered in welding small articles manufactured from aluminum clad steel is the inaccessibility of the aluminum cladding when it is on the inside of such articles. The joining or welding of such articles must of necessity be carried out from the steel side. It is an object of this invention to provide a method of welding aluminum clad steel from the steel side. It is a further object to provide a method of manufacturing aluminum clad steel pipe having aluminum cladding on the inner surface thereof. Still another object is to provide a method of joining sections of aluminum clad steel pipe having the aluminum cladding on the inner surface thereof. These and other objects will become apparent to those skilled in the art as the description of the invention proceeds.

In accordance with my invention, the steel, from the steel side of a first aluminum clad steel member, is removed whereby the aluminum cladding extends beyond the steel side. A second aluminum clad steel member prepared in the same manner is juxtaposed the first member in welding relationship whereby the aluminum edges are butted together and the steel edges form a welding groove. The aluminum edges are then electrically welded using a non-consumable electrode, preferably consisting essentially of tungsten, while blanketing the area being welded with an inert gaseous medium such as argon. An inert gas may be used on the underside of the weld joint, although this use is not essential. A root pass between the steel edges is then made with a non-consumable electrode such as one consisting essentially of tungsten, while blanketing the area surrounding the weld with an inert gaseous medium such as argon; the root pass weld is carried out in a manner hereinafter described whereby the arc from the non-consumable electrode does not impinge upon the aluminum cladding. After completing the root pass weld, the weld between the steel edges is completed. A grooved or a plain back-up bar or bars may be positioned on the aluminum cladding directly opposed or immediately adjacent to the area being welded whereby excessive heat is conducted away from the aluminum.

In the drawings referred to below, I have shown a preferred embodiment of my invention, it being understood that this is by way of example only.

Figure 1:
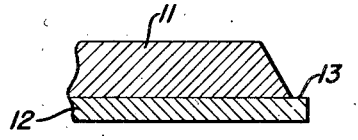
Figure 1 is a sectional view of an aluminum clad steel member prepared for welding.

Referring to Figure 1, I have shown an aluminum clad steel member which has been prepared for welding. The steel side 11 has been cut back from the aluminum cladding side 12 exposing an edge 13. The thickness of the steel side 11 may be varied in accordance with the use in which it is to be employed. For instance, if the aluminum clad steel member is to be used in fabricating a low pressure chemical reactor, it may be on the order of ¼ or more inches in thickness; if, however, the aluminum clad steel member is to be used in fabricating a relatively high pressure reactor or the like, it may be on the order of two to three inches or more in thickness. The aluminum clad side 12 will normally be on the order of ⅛ inch or more in thickness, but will not vary widely in thickness for various uses. For instance, an aluminum cladding thickness of about 3/16 of an inch on a steel base plate 5/16 of an inch is preferable for making a composite member having a thickness of ½ inch. The ratio of thickness of the two members may be varied but it has been found practical from both the economic and structural viewpoint to employ composite members having a relatively thicker steel side for structural purposes and a relatively thinner aluminum clad side for protective purposes. The extending edge 13 of the aluminum clad side 12 for a ½ inch composite member as described above is preferably about ⅛ inch. The distance the edge 13 extends beyond the steel side 11 may be varied depending upon the thickness of the aluminum side and/or steel side and the type of welding joint employed.

Figure 2:
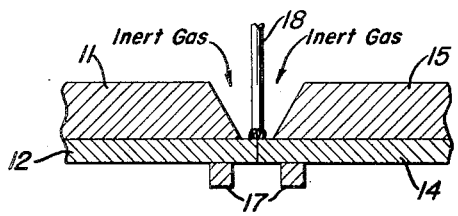
Figure 2 is a sectional view of two aluminum clad steel members in welding relationship.

In Figure 2, two aluminum clad members prepared as described above are shown in welding relationship to one another. The aluminum clad sides 12 and 14 are butted together and the steel sides 11 and 15 form a welding groove. Welding grooves other than the V-groove indicated may be used. The butt joint between the aluminum sides 12 and 14 may be modified to form a V-groove or the like; this would only be necessary if the aluminum cladding was relatively thick, for instance, on the order of ⅜ inch thick or more. Copper back-up bars 17 may be positioned against the aluminum side as shown. Excessive heat developed during the welding step will thus be removed by the back-up bars and prevent burning through of the aluminum. The use of the back-up bars 17 is not essential but is desirable in that it promotes more rapid and less exacting welding. A non-consumable electrode 18, such as a thoriated-tungsten welding rod commercially available from the Linde Air Products Co. or Air Reduction Sales Co., is used to weld the aluminum sides 12 and 14 together. During this phase of the welding operation, an inert gas is used to blanket the weld to prevent oxidation of the aluminum.

Other non-consumable electrodes may be used in place of the particular electrode described; for instance, carbon electrodes may be used, or electrodes of pure tungsten or tungsten containing minor amounts of zirconium. The inert gas used for blanketing the weld is preferably argon, although any gas non-reactive with aluminum and steel at high temperatures may be used, such as helium, carbon dioxide, krypton, xenon or mixtures thereof. It is not necessary to use filler aluminum material in making the butt weld shown in Figure 2. However, if a welding groove is formed in the aluminum sides, it would be necessary to use aluminum filler metal.

Figure 3:
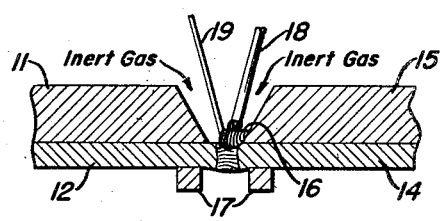
Figure 3 is a sectional view of two aluminum clad steel members illustrating the method of making the root pass weld.

In Figure 3, the method of making the root pass weld 16 between the steel sides is shown. Following completion of welding the aluminum sides 12 and 14 together, an arc from a non-consumable electrode 18 is struck against either of the steel sides 11 or 15; as shown in the drawing, the arc has been struck against steel side 15. Filler metal, preferably of the same composition as the steel sides 11 and 15, is supplied by rod 19 which is interposed between the arc of the non-consumable electrode 18 and the aluminum sides. While carrying out this welding operation, inert gas, such as argon, is used to blanket the weld to inhibit oxidation of the aluminum and the steel. It is essential during this root pass welding step that the arc from the welding rod 18 does not impinge directly upon the aluminum. This prevents excessive alloying between the steel and the aluminum, which excessive alloying produces a very weak and brittle joint. The presence of the copper back-up bars 17 helps in dissipating the heat developed by the weld and reduces the incidence of over-alloying between the steel and aluminum. If careful welding technique is observed, the back-up bars 17 may be dispensed with.

Figure 4:
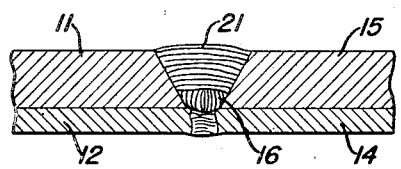
Figure 4 is a sectional view of two aluminum clad steel members welded in accordance with the invention.

In Figure 4, a finished weld between aluminum clad members is shown. The aluminum clad sides 12 and 14 and the root pass weld 16 between steel sides 11 and 15 were made as hereinbefore described. The weld metal 21 is deposited by any of the conventional methods of welding steel members. Weld metal 21 may be deposited electrically with flux covered consumable electrodes, by submerged arc welding, it may be deposited using the method hereinbefore described, or it may be deposited using a gas welding torch with filler metal welding rod. The copper back-up bars 17 shown in Figures 2 and 3 are not necessary when depositing weld metal 21 although it is generally most convenient to leave them so positioned until the complete welding operation is finished.

Using the welding method described in connection with Figures 1 to 4, I have found that the penetration of the root pass weld into the aluminum is practically negligible thus preventing over-alloying of the steel and aluminum which would result in a weakened joint as hereinbefore described and I have also found that aluminum sides 12 and 14 are welded together quite evenly and the aluminum side of the aluminum clad steel presents a relatively smooth surface with very little bulge at the weld.

Figure 5:
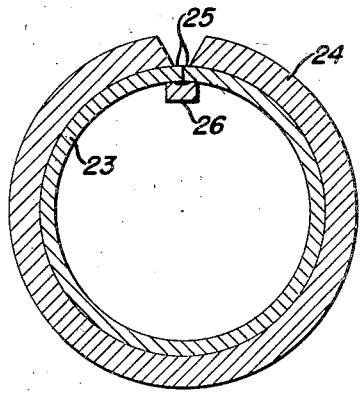
Figure 5 is a cross-section of a pipe prepared for longitudinal welding in accordance with the invention.

Employing the welding method described above on aluminum clad steel members, numerous articles may be manufactured. For instance, the walls of chemical reactors and the like may be so welded, as may be the walls of storage tanks and the like. My method of welding aluminum clad steel, however, is particularly applicable in manufacturing aluminum clad steel pipe having an aluminum cladding on the inside thereof. In Figure 5, I have shown a cross-sectional view of such a pipe prepared for welding. The pipe may be constructed by bending an aluminum clad steel plate into the shape shown in Figure 5. The inner aluminum cladding 23 is butted together and a welding groove formed between the edges of the steel side 24. The edges of the steel side 24 may be cut back before the aluminum clad steel sheet is formed into a pipe or the welding groove may be formed after the pipe forming operation. It is also contemplated that the aluminum sheet which is clad to the steel may be wider than the steel plate, thus preforming the extending edges 25. A grooved copper backup bar 26 is shown directly opposed to the welding groove. This placement of the back-up bar 26 may be used rather than the placement shown in Figures 2 and 3. If a single back-up bar is used, as shown in Figure 5, it is preferable that it be provided with a groove corresponding to the juncture of the aluminum edges; thus, when the first welding step is carried out, complete fusing of the aluminum edges is obtained and a very slight bead is formed on the aluminum side.

Figure 6:
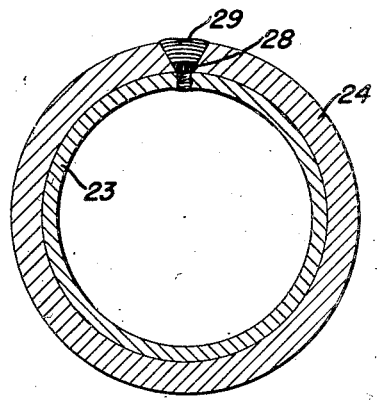
Figure 6 is a cross-section of a pipe longitudinally welded in accordance with the invention.

In Figure 6, a sectional view of a pipe having a completed longitudinal weld is shown. The method of welding the pipe is identical to that described in connection with Figures 1 to 4. The aluminum cladding 23 is first welded from the steel side as shown in Figure 2. The root pass weld 28 is then made as shown in Figure 3 and the remainder of the weld 29 may be made by any of the conventional welding techniques as hereinbefore described.

Figure 7:
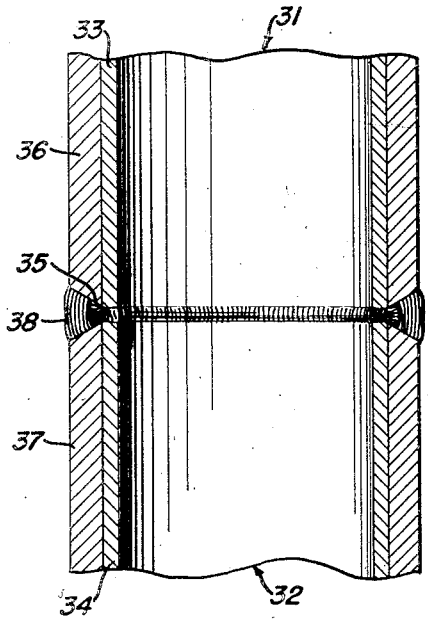
Figure 7 is a longitudinal cross-section of a pipe welded in accordance with the invention.

In Figure 7, I have shown a longitudinal cross-section of two sections of pipe 31 and 32 which have been welded together in accordance with the welding method hereinbefore described. Before welding, the ends of the pipe 31 and 32 are prepared as shown in Figure 1; thus the inner aluminum clad sides 33 and 34 form collarlike projections which, when butted together, form a welding groove as shown in Figure 2. Back-up rings (not shown) may be used if desired during the welding operation; either a double back-up ring comparable to the double back-up bar shown in Figure 2 may be used or a single back-up ring similar to the single back-up bar shown in Figure 5 may be used. The welding method as described hereinbefore is then used to join the two sections of pipe together. Aluminum sides 33 and 34 are thus welded together, root pass 35 is made joining steel sides 36 and 37, and weld 38 is made to finish joining the two sections of pipe 31 and 32. The advantage of manufacturing and/or welding sections of pipe as shown in Figures 5 to 7 is obvious. In relatively small diameter pipe, it would be practically impossible to carry out any of the welding steps from the aluminum side. Using my welding method, the complete weld may be made from the steel side. If, however, the aluminum side is accessible, the first welding step joining the aluminum may be made from that side.

It is contemplated that other articles may be manufactured of aluminum clad steel using my welding method. It is also contemplated that the steel in the aluminum clad steel members or pipes joined by the method hereinbefore described may consist of any of the carbon steels or stainless steels which are adaptable to having aluminum clad thereto.

While specific examples of the invention have been described in some detail, other modifications will be apparent from the foregoing description to those skilled in the art.

I claim:

1. The method of welding aluminum clad steel members having edges which are juxtaposed and in welding relationship to one another which method comprises electrically welding the aluminum edges of said aluminum clad steel members with a non-consumable electrode while blanketing the molten portions of the weld with an inert gaseous medium, electrically welding a root pass between the steel edges of said aluminum clad steel members with a non-consumable electrode while avoiding impingement of the arc from said electrode upon said aluminum cladding and while blanketing the molten portions of the weld with an inert gaseous medium, and completing said weld between said steel edges.

2. The method of claim 1 wherein said non-consumable electrode consists essentially of tungsten and said inert gaseous medium consists essentially of argon.

3. The method of claim 1 wherein at least one back-up bar is positioned on the aluminum clad side in close proximity to the juncture of said aluminum edges during said welding steps whereby excessive heat is conducted away from said aluminum.

4. The method of joining aluminum clad steel members which members have a steel side and an aluminum clad side thinner than said steel side, which method comprises removing steel from at least one edge of the steel side of a first member whereby the aluminum clad side extends beyond the edge of the steel side, removing steel from at least one edge of the steel side of a second member, positioning said first member and said second member in welding relationship whereby said extending aluminum edges are butted together and the edges of said steel sides are juxtaposed forming a welding groove, electrically welding the aluminum edges with a non-consumable electrode while blanketing the molten portions of the weld with an inert gaseous medium, electrically welding a root pass between the steel edges of said aluminum clad steel members with a non-consumable electrode while avoiding impingement of the arc from said electrode upon said aluminum cladding and while blanketing the molten portions of the weld with an inert gaseous medium, and completing said weld between said steel edges.

5. The method of claim 4 wherein said non-consumable electrode consists essentially of tungsten and said inert gaseous medium consists essentially of argon.

6. The method of claim 4 wherein at least one back-up bar is positioned on the aluminum clad side in close proximity to the juncture of said aluminum edges during said welding steps whereby excessive heat is conducted away from said aluminum.

7. The method of manufacturing steel pipe having an aluminum cladding on its inner surface which method comprises removing steel from the longitudinal edges of the steel side of an aluminum clad steel plate of predetermined size whereby said aluminum clad side extends beyond the longitudinal edges of said steel side, bending said plate to form a pipe whereby said longitudinal extending aluminum edges are butted together along the inner surface of said pipe and the longitudinal edges of the steel side are juxtaposed forming a welding groove, electrically welding the aluminum edges with a non-consumable electrode while blanketing the molten portions of the weld with an inert gaseous medium, electrically welding a root pass between the steel edges of said aluminum clad steel members with a non-consumable electrode while avoiding impingement of the arc from said electrode upon said aluminum cladding and while blanketing the molten portions of the weld with an inert gaseous medium, and completing said weld between said steel edges.

8. The method of claim 7 wherein said non-consumable electrode consists essentially of tungsten and said inert gaseous medium consists essentially of argon.

9. The method of claim 7 wherein at least one back-up bar is positioned on the aluminum clad side in close proximity to the juncture of said aluminum edges during said welding steps whereby excessive heat is conducted away from said aluminum.

10. The method of joining steel pipe having an aluminum clad inner surface which method comprises removing steel from one end of a first pipe whereby the aluminum cladding extends beyond the end of the steel, removing steel from one end of a second pipe whereby the aluminum cladding extends beyond the end of the steel, positioning said first pipe and said second pipe in welding relationship whereby said extending aluminum ends are butted together and the ends of said steel pipe are juxtaposed forming a welding groove, electrically welding said aluminum ends with a non-consumable electrode while blanketing the molten portions of the weld with an inert gaseous medium, electrically welding a root pass between said ends of said steel pipe with a non-consumable electrode while avoiding impingement of the arc from said electrode upon said aluminum cladding and while blanketing the molten portions of the weld with an inert gaseous medium, and completing said weld between said steel ends.

11. The method of claim 10 wherein said non-consumable electrode consists essentially of tungsten and said inert gaseous medium consists essentially of argon.

12. The method of claim 10 wherein at least one back-up ring is positioned on the aluminum clad side in close proximity to the juncture of said aluminum ends during said welding steps whereby excessive heat is conducted away from said aluminum.

References Cited in the file of this patent

UNITED STATES PATENTS

| | | |
|---|---|---|
| 1,934,065 | Hermanson | Nov. 7, 1933 |
| 2,405,542 | Wassell | Aug. 6, 1946 |